United States Patent [19]

Roes et al.

[11] 4,357,530
[45] Nov. 2, 1982

[54] MODULARIZED TICKET HANDLING SYSTEM FOR USE IN AUTOMATIC TICKET PROCESSING SYSTEM

[75] Inventors: John B. Roes, San Diego; Guy M. Kelly, La Jolla; Robert F. Case; Chandler R. Deming, both of San Diego, all of Calif.

[73] Assignee: Cubic Western Data, San Diego, Calif.

[21] Appl. No.: 211,021

[22] Filed: Dec. 1, 1980

[51] Int. Cl.³ .............................................. G06K 7/00
[52] U.S. Cl. ..................................... 235/384; 235/475
[58] Field of Search ............... 235/475, 476, 477, 479, 235/480, 481, 483, 486, 375, 384

[56] References Cited

U.S. PATENT DOCUMENTS 3,501,622  3/1970  Weir et al. ......................... 235/384

*Primary Examiner*—Thomas A. Robinson
*Attorney, Agent, or Firm*—Brown & Martin

[57] ABSTRACT

A ticket handling system for use in a ticket processing system that includes a transducer for reading an encoded ticket entered by a patron and for providing a read signal in response thereto and apparatus for subsequently passing the ticket to an exit position where the ticket is accessible for return to the patron. The ticket handling system includes a transport module including the transducer for reading the encoded ticket and for providing a read signal in response thereto; an entry module coupled to the transport module for entering the ticket into the transport module; and a third module mechanically interfaced with the transport module and including structure defining a return passage for passing the ticket from the transport module to an exit position where the ticket is accessible for return to the patron. The third module may be a diverter module that further includes a capture passage for passing the ticket from the transport module to a position where the ticket is inaccessible to the patron; and a diverter for diverting the ticket into either the return passage or the capture passage in response to a control signal produced in response to reading the ticket.

22 Claims, 11 Drawing Figures

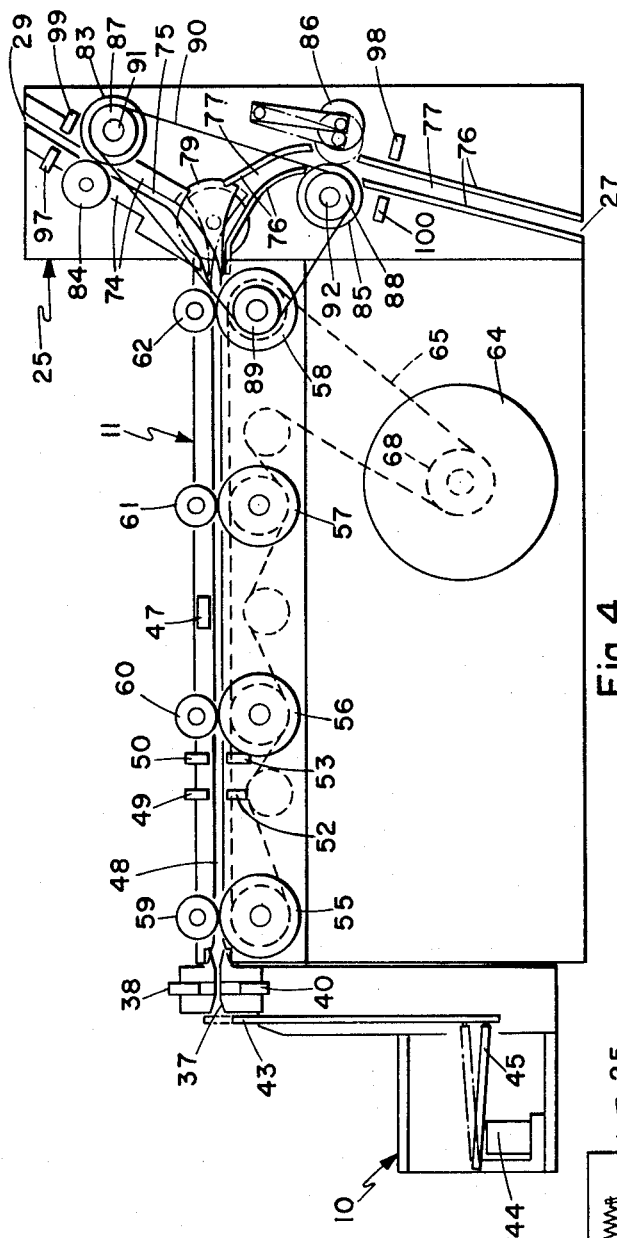
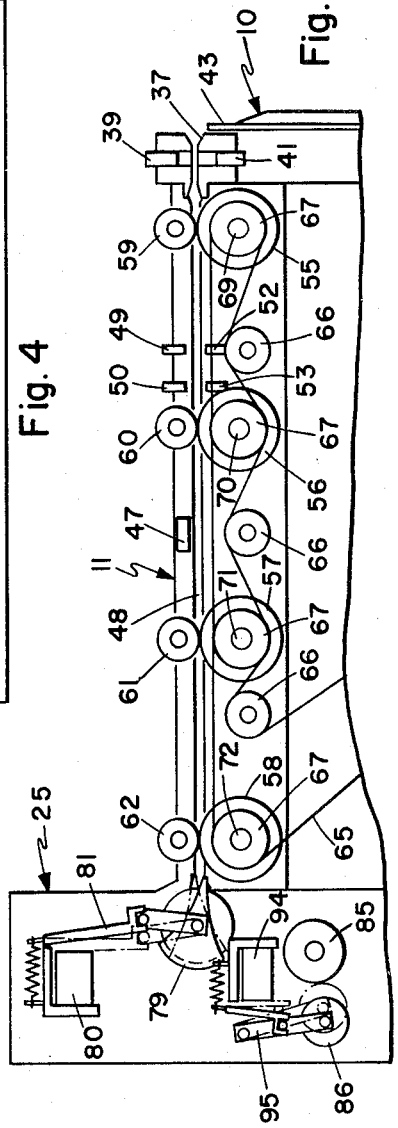
Fig. 4
Fig. 5

MODULARIZED TICKET HANDLING SYSTEM FOR USE IN AUTOMATIC TICKET PROCESSING SYSTEM

CROSS-REFERENCE TO RELATED APPLICATIONS

This application is related to the following co-pending U.S. Patent Applications being filed on Dec. 1, 1980.

"Ticket Transport" by Royal Carlton Moore, Jr. Charles Lee Hayman, and John B. Roes, Ser. No. 211,023

"Ticket Diverter Module" by Gregory E. Miller and John E. Toth, Ser. No. 211,029;

"Stepper Motor Control Circuit" by Charles Lee Hayman Ser. No. 211,026

"Static Diverter Module" by Gregory E. Miller Ser. No. 211,024;

"Ticket Exit Drive Module" by Gregory E. Miller Ser. No. 211,027;

"Ticket Metering and Throat Barrier Module" by Darrell V. Howerton Ser. No. 211,030; and "Modularized Ticket Handling System For Use In Automatic Ticket Preparation System" by John B. Roes, Guy M. Kelly, Robert F. Case and Chandler R. Deming Ser. No. 211,022.

BACKGROUND OF THE INVENTION

The present invention generally pertains to automatic ticket processing systems, and is particularly directed to an improved ticket handling system for use in a ticket processing system of the type wherein an encoded ticket is entered by a patron.

Such a ticket processing system typically includes a transducer for reading an encoded ticket entered by a patron and for providing a read signal in response thereto and apparatus for subsequently passing the ticket to an exit position where the ticket is accessible for return to the patron. The ticket processing system may further include a signal processor for processing the read signal and for providing control signals subsequent thereto to indicate whether the ticket is to be returned to the patron or captured.

The ticket handling system is that portion of the ticket processing system that includes the transducer and apparatus for passing the tickets to either the exit position or a capture position where the ticket is inaccessible to the patron. Prior art ticket handling systems include a large number of components in combination, whereby the installation of the ticket handling system in a ticket processing system is complex and quite time consuming. Repairs of such prior art ticket handling systems likewise tend to be quite time consuming and result in lengthy interruptions in the operation of the ticket processing systems while repairs are being made.

SUMMARY OF THE INVENTION

The present invention provides a modularized ticket handling system wherein a relatively small number of modules containing apparatus for performing basic ticket handling functions are mechanically interfaced with one another. As a result when a component of the ticket handling system malfunctions, the module containing the malfunctioning component can be readily and quickly replaced with a like module; whereby there will be only a short interruption in the operation of the ticket processing system. The time consuming repair or replacement of the malfunctioning component then can be performed after the module has been removed from the system.

The basic functions necessary to the operation of a ticket handling system have been divided in accordance with the present invention to provide a combination of functional modules that are mechanically interfaced to provide an efficient ticket handling system that is easy to assemble and install in a short time. The basic ticket handling system of the present invention includes a transport module including the transducer for reading the encoded ticket and for providing the read signal in response thereto; and preferably includes an entry module for entering the ticket into the transport module. Most embodiments of the ticket handling system further include a third module mechanically interfaced with the transport module and including structure defining a return passage for passing the ticket from the transport module to an exit position where the ticket is accessible for return to the patron.

The functions performed by each module are selected so that the modules can be combined in a number of different combinations to satisfy particular requirements for different types of ticket handling systems. These different combinations also sometimes utilize specific functional modules, such as a diverter module and an exit module, and form various alternative preferred embodiments of the present invention.

When included in the ticket handling system, the diverter module is mechanically interfaced with the transport module and includes structure defining a capture passage for passing the ticket from the transport module to the capture position where the ticket is inaccessible to the patron. In one embodiment, the diverter module is the third module and further includes the structure defining the return passage for passing the ticket from the transport module to the exit position where the ticket is accessible to the patron. In another embodiment, the diverter module is mechanically interfaced with and between the entry module and the transport module; and the third module is an exit module including the structure defining the return passage.

How these modules are combined and other features of the present invention are more fully discussed in the description of the preferred embodiments.

BRIEF DESCRIPTION OF THE DRAWING

FIG. 4 is a schematic side elevation view of the combination of modules included in the ticket handling system of FIG. 2.

FIG. 5 is a schematic side elevation view of the opposite side from that shown in FIG. 4.

DESCRIPTION OF THE PREFERRED EMBODIMENTS

Figure 1:
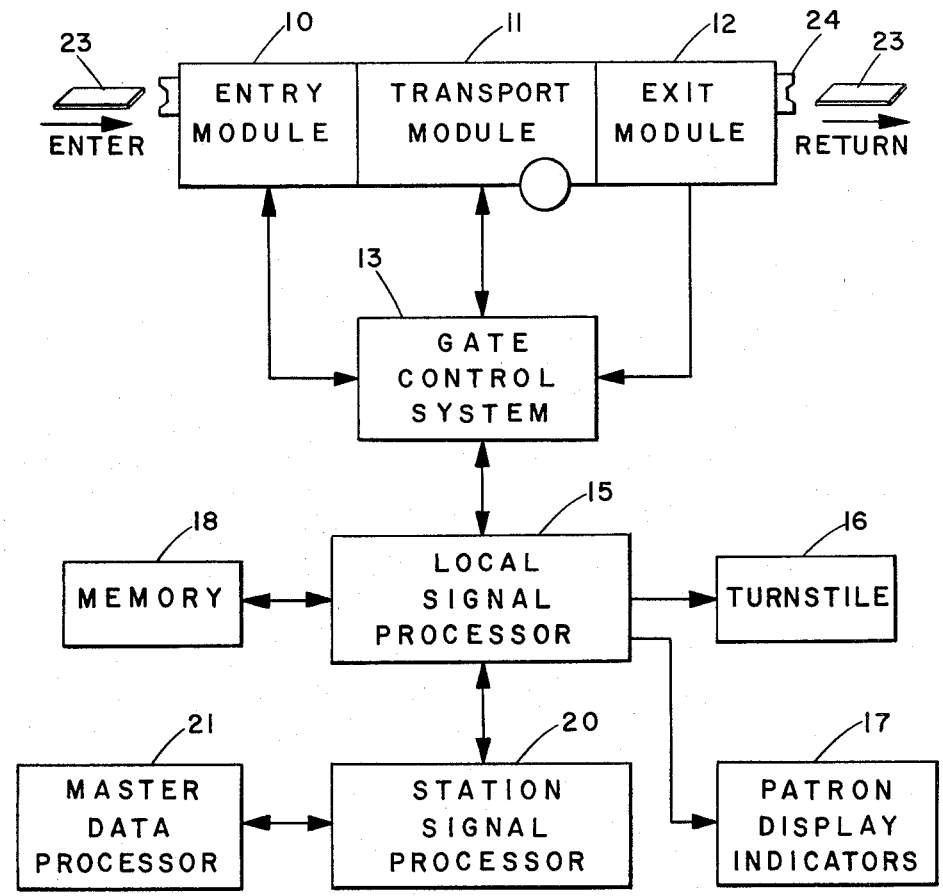
FIG. 1 is a block diagram illustrating a preferred embodiment of the ticket handling system of the present invention as included in an automatic ticket processing system for an entry gate for a mass transportation system.
Figure 2:
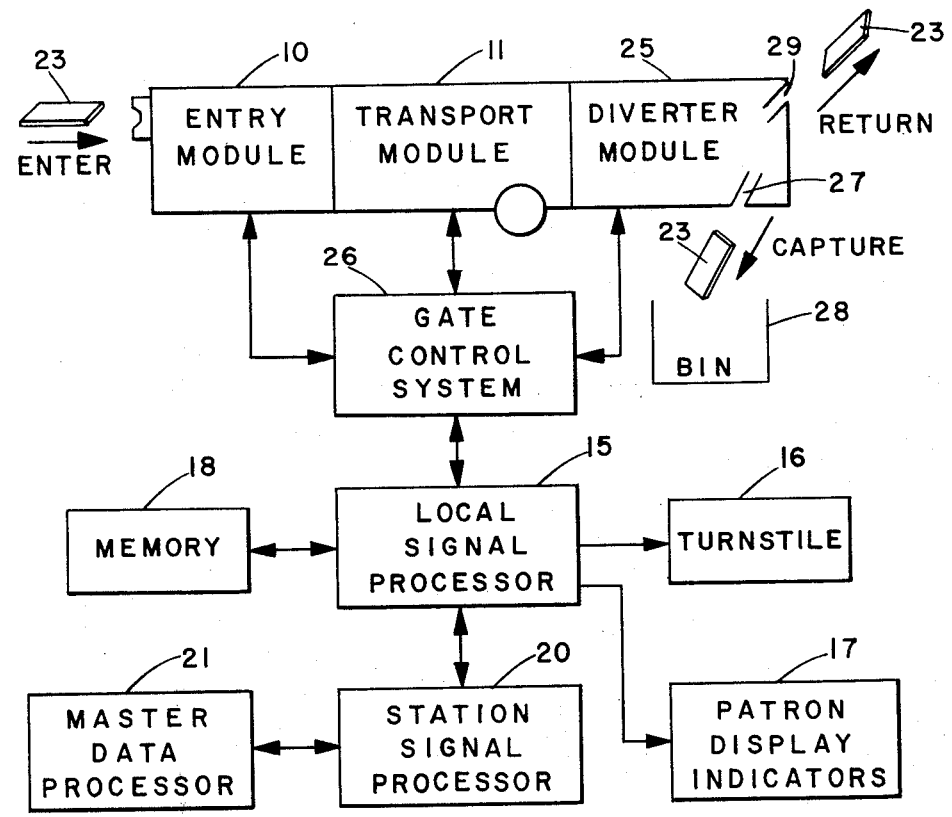
FIG. 2 is a block diagram illustrating a preferred embodiment of the ticket handling system as included in an automatic ticket processing system for an exit gate for a mass transportation system.
Figure 3:
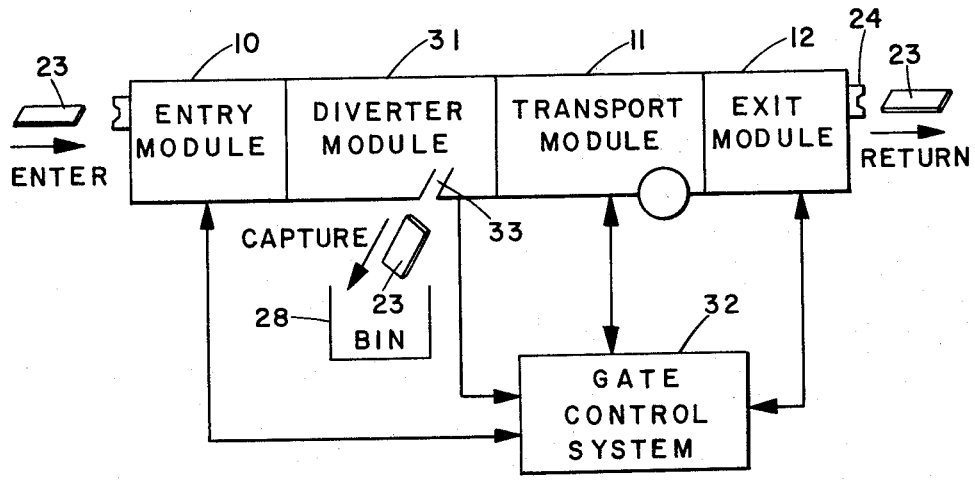
FIG. 3 is a block diagram illustrating an alternative embodiment that may be included in the ticket processing system of FIG. 2.
Figure 6:
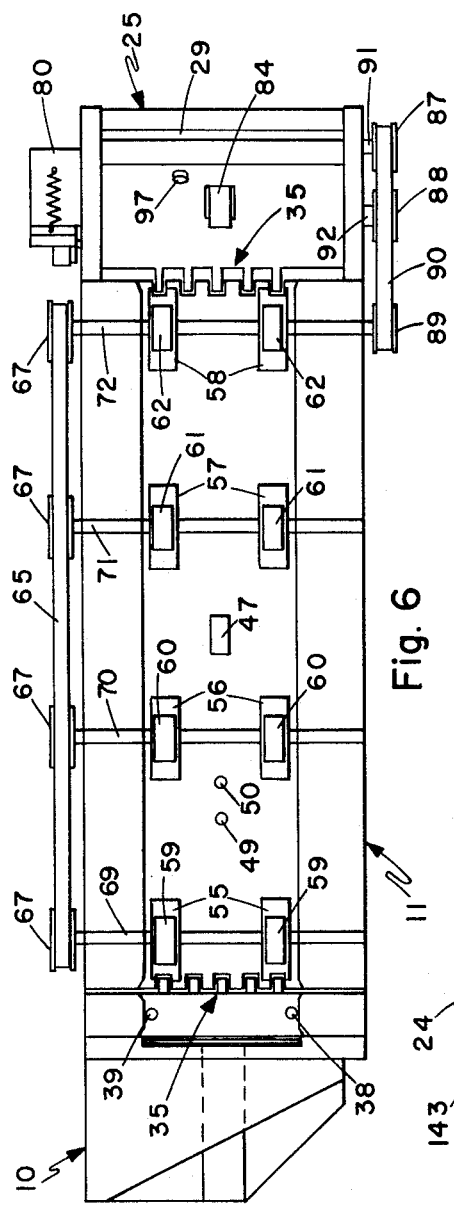
FIG. 6 is a top plan view of the assembly of modules shown in FIG. 4.

Preferred embodiments of the ticket handling system of the present invention are illustrated in FIGS. 1, 2 and 3 as being included in automatic ticket processing systems for automatic ticket gates for a mass transportation system having a plurality of stations at which tickets are sold and at which patrons board transportation vehicles. There are a plurality of automatic ticket gates at each station. There are two types of automatic ticket gates, an entry gate and an exit gate, which process the encoded ticket and operate a turnstile (passage barrier) to allow the passage of a patron. The patron gains access to a boarding area for a transportation vehicle by passing through the entry gate, and leaves the area of access to the transportation vehicles by passing through the exit gate.

The automatic entry gate illustrated in FIG. 1 includes a ticket handling system. The ticket handling system includes an entry module 10, a transport module 11, an exit module 12, and a gate control system 13.

The automatic entry gate further includes a local signal processor 15, a turnstile 16, patron display indicators 17, and a memory 18. Each of the entry gates is coupled to a station signal processor 20 by the local signal processor 15. There is only one station signal processor at each station. The station signal processors 20 at the different stations of the transportation system are all coupled to a single master data processor 21.

The patron enters his encoded ticket 23 through the entry module 10 into the transport module 11, where the encoded ticket is read by a transducer to provide a read signal. The read signal is fed through the gate control system 13 and the local signal processor 15 to the station signal processor 20. The station signal processor 20 processes the read signal and determines whether the encoded signal on the entered ticket in the transport module 11 indicates sufficient fare to allow the patron to pass through the entry gate where he has presented the ticket. If not, a signal to indicate that the fare value of the ticket is inadequate is sent to the patron display indicators 17 via the local signal processor 15, the ticket 23 is returned to the patron via the exit module 12, and the turnstile remains locked to bar entry by the patron.

The station signal processor 20 also provides a control signal to the gate control circuit 13 which causes the transport module 11 to transport the ticket to an exit position 24 in the exit module 12 where the ticket 23 is accessible to the patron. The ticket 23 is always returned to the patron by the entry gate notwithstanding whether it has any remaining fare value.

If the station signal processor 20 determines upon processing the read signal from the transducer in the transport module 11 that the encoded signal on the entered ticket does indicate sufficient fare to allow the patron to pass through the entry gate, it causes a turnstile enable signal to be transmitted to the turnstile 16 via the local signal processor 15 to enable operation of the turnstile 16 to allow the patron to pass through the entry gate. Upon determining that the fare indicated by the read signal is sufficient, the station signal processor 20 further provides a write signal to the transducer in the transport module 11 via the local signal processor 15 and the gate control system 13 for reencoding the ticket to indicate a reduced fare value. A signal indicating the reduced fare value is provided to the patron display indicators via the local signal processor 15. The reencoded ticket is again read by the transducer to provide a second read signal. The second read signal is provided to a verification circuit in the gate control system 13. The verification circuit compares the second read signal to the write signal. If the second read signal initially does not correspond to the write signal, the ticket is again reencoded, and the ticket is again read to provide a new second read signal. The new second read signal is compared to the write signal. If the new second read signal still does not correspond to the write signal, the ticket is reencoded for a third time and the comparison step is again repeated. This process of reencoding and comparing can be repeated any predetermined number of times when the comprison fails to indicate a correspondence between the write signal and the second read signal. It is preferred to limit the number of such repetitions to three. The verification circuit provides a verification signal either after a comparison in which the write signal corresponds to the second read signal, or after the repeated series of non-corresponding comparisons is completed. The verification signal indicates whether the second read signal corresponds to the write signal. The verification signal is provided via the local signal processor 15 to the station signal processor 20. The station signal processor 20 processes the verification signal and provides a signal via the local signal processor 15 to the patron display indicators 17 to indicate whether the reduced fare has been correctly encoded on the ticket by the transducer in the transport module 11. The ticket is then returned to the patron via the exit module 12. If the patron has received an indication from the display indicators 17 that his ticket has a reduced fare value that has not been correctly reencoded on his ticket he then may notify the station attendant of such matter, so that he can be issued another ticket having the correct encoded fare value.

The master data processor 21 provides signals to the station signal processor 20 for updating fare tables and various signal processing routines stored in the station signal processor 20.

The memory 18 is connected to the local signal processor 15 for storing data that must remain secure from accidental destruction and unauthorized access, such as running totals and values of tickets processed by the automatic entry gate. The data stored in the memory 18 can be retrieved in response to signals from either the station signal processor 20 or the master data processor 21.

An automatic ticket processing system for an exit gate is illustrated in FIG. 2. The ticket handling system of the automatic ticket processing system of FIG. 2 includes an entry module 10, a transport module 11, a diverter module 25 and a gate control system 26. The automatic exit gate further includes a local signal processor 15, a turnstile 16, patron display indicators 17 and a memory 18. Each of the exit gates is coupled to the station signal processor 20, which is coupled to the master data processor 21.

The patron enters his encoded ticket 21 through the entry module 10 into the transport module 11, where the encoded ticket is read by the transducer to provide a read signal. The read signal is fed by the gate control system 26 and the local signal processor 15 to the station signal processor 20. The station signal processor 20 processes the read signal and determines whether the ticket still retains any fare value. If not, a control signal is provided by the station signal processor 20 through the local signal processor 15 to the gate control system 26, which causes the ticket 23 to be transported from the transport module 11 to a capture position 27 in the diverter module 25 where the ticket 23 is inaccessible to the patron. The ticket 23 drops from the capture position 27 into a bin 28 where used tickets having no additional fare value are accumulated. After processing the read signal, the station signal processor 20 provides a turnstile enable signal through the local signal processor 15 to the turnstile 16 to enable operation of the turnstile 16 to allow the patron to pass through the exit gate; and the station signal processor 20 further provides a signal via the local signal processor 15 to the patron display indicators 17 to indicate to the patron that the ticket 23 is being captured because it does not have any further fare value.

If the station signal processor 20 determines upon processing the read signal, that the ticket 23 has additional fare value, a control signal is provided by the station signal processor 20 through the local signal processor 15 to the gate control system 26, which causes the ticket 23 to be transported from the transport module 11 to an exit position 29 in the diverter module 25 where the ticket 23 is accessible to the patron. After processing the read signal, the station signal processor 20 provides a turnstile enable signal through the local signal processor 15 to the turnstile 16 to enable operation of the turnstile 16 to allow the patron to pass through the exit gate; and further provides a signal via the local signal processor 15 to the patron display indicators 17 to indicate the remaining fare value to the patron. When an indication of remaining fare value is so provided, but the ticket is nevertheless captured, the patron may notify the station attendant so that the ticket 23 can be retrieved.

The memory 18 is connected to the local signal processor 15 for storing data that must remain secure from accidental destruction and unauthorized access, such as running totals of tickets captured and running totals and values of tickets processed by the automatic exit gate. The data stored in the memory 18 can be retrieved in response to signals from either the station signal processor 20 or the master data processor 21.

FIG. 3 illustrates an alternative arrangement of the modules of the automatic ticket handling system for the automatic ticket processing system for an exit gate. The automatic ticket handling system includes an entry module 10, a diverter module 31, a transport module 11, an exit module 12, and a gate control system 32; and is connected to the local signal processor 15, turnstile 16, patron display indicators 17, memory 18, station signal processor 20 and master data processor 21 in the same manner as shown in FIG. 2. The ticket handling system of FIG. 3 differs from the ticket handling system of FIG. 2 in the following respects. The diverter module 31 is mechanically interfaced with and between the entry module 10 and the transport module 11 in the system of FIG. 3 for transporting the ticket 23 to a capture position 33 in response to a control signal from the station signal processor 20 indicating that the ticket 23 is to be captured; and the exit module 12 is mechanically interfaced with the transport module 11 for passing the ticket to an exit position 24 where the ticket 23 is accessible to the patron. Tickets entered by the patron into the entry module 10 are transported through the diverter module 31 into the transport module 11 where the transducer 10 reads the encoded ticket and provides the read signal to the station signal processor 20 to initiate the further ticket processing described above with the relation to the system of FIG. 2.

The tickets used with this system preferably include a magnetic recording medium which is magnetically encoded to contain ticket information. A system for preparing the tickets used with the ticket handling system of the present invention is described in the cross-referenced patent application by John B. Roes, Guy M. Kelly, Robert F. Case and Chandler R. Deming for "Modularized Ticket Handling System For Use In Automatic Ticket Preparation System", the disclosure of which is incorporated herein by reference thereto.

The ticket handling system used in the ticket processing system for an exit gate, as shown in FIG. 2, is described with reference to FIGS. 4, 5, 6 and 10. In this ticket handling system, the transport module 11 is mechanically interfaced with and between the entry module 10 and the diverter module 25. The interfaced modules 10, 11 and 25 include captive bolts (not shown) for coupling these modules to a supporting plate (not shown) in predetermined positions on the plate to effect the mechanical interfacing between the modules. The modules 11 and 25 further include interlocking fingers 35 (FIG. 6) for coupling these modules so as to provide a continuous, aligned, unobstructed passage for the tickets from one module to another.

The entry module 10 defines an entry throat 37 through which a ticket may be entered into the transport module 11. Photosensors 38 and 39 are positioned adjacent opposite sides of the entry throat 37 and are a predetermined distance apart for sensing when a ticket of at least a predetermined width is entered through the throat 37. Light emitting diodes (LED's) 40 and 41 are positioned opposite the photosensors 38 and 39 for providing light beams to the photosensors that are interrupted when a ticket passes between the LED's 40, 41 and the photosensors 38, 39 respectively. The photosensors 38, 39 thereby also sense the passage of a ticket through the throat 37 of the entry module 10.

The entry module 10 further includes a movable barrier 43 that is movable between a first position shown by broken lines and a second position shown by solid lines. When in the first position, the barrier 43 blocks the entry of tickets through the throat 37 of the entry module 10. When in the second position, the barrier 43 enables tickets to be entered through the throat 37. A barrier solenoid 44 is connected to the barrier 43 for moving the barrier 43 between the first and second positions. The barrier solenoid 44 is connected to the barrier 43 by an arm 45, which is shown by broken lines for the first (blocking) position of the barrier 43 and by solid lines for the second (enabling) position of the barrier 43.

A preferred embodiment of the entry module 10 is more fully described in the cross-referenced patent application by Darrell V. Howerton for "Ticket Metering and Throat Barrier Module", the disclosure of which is incorporated herein by reference thereto.

The transport module 11 includes as a transducer a magnetic recording head 47 for reading a magnetically encoded ticket and providing a read signal in response thereto and for encoding information on a ticket in response to a write signal. The transport module defines a transport passage 48 through which the ticket is transported past the transducer head 47.

The transport module 11 includes a first photosensor 49 and a second photosensor 50. The first photosensor 49 is positioned for sensing the entry of a ticket by a first predetermined distance from the photosensors 38, 39 into the transport passage 48 of the transport module 11. The second photosensor 50 is positioned for sensing the entry of a ticket by a second predetermined distance from the photosensor 38, 39 into the transport passage 48 of the transport module 11 greater than the first predetermined distance. LED's 52 and 53 are positioned opposite the photosensors 49 and 50 for providing light beams to the photosensors 49, 50 that are interrupted when a ticket passes between the LED's 52, 53 and the photosensors 49, 50 respectively.

The transport module 11 further includes a system of transport rollers, including drive rollers 55, 56, 57 and 58 and corresponding pressure rollers 59, 60, 61 and 62 for transporting a ticket through the transport passage of the transport module 11. The transport roller system is bidirectional. A bidirectional driver motor 64 is coupled to the transport rollers by a belt 65 for driving the transport rollers. The belt 65 passes over idler rollers 66, drive roller pulleys 67 and a drive motor pulley 68. The drive roller pulleys 67 are attached to the axles 69, 70, 71 and 72 of the respective drive rollers 55, 56, 57 and 58.

The drive roller 55 is located between the entry module 10 and the second photosensor 50. The drive roller 56 is located a third predetermined distance from the drive roller 55 in a direction away from the entry module 10. This third predetermined distance is less than the second predetermined distance from the photosensors 38, 39 to the second photosensor 50 and is not less than the first predetermined distance from the photosensors 38, 39 to the first photosensor 49.

A preferred embodiment of the transport module 11 is more fully described in the cross-referenced patent applications by Royal Carlton Moore, Jr. et al for "Ticket Transport" and by Charles Lee Hayman for "Stepper Motor Control Circuit", the disclosures of which are incorporated herein by reference thereto.

The diverter module 25 includes structure 74 defining a return passage 75 for passing a ticket from the transport passage 48 of the transport module 11 to the exit position 29 where the ticket is accessible to a patron. The diverter 25 further includes curved structure 76 defining a capture passage 77 for passing a ticket from the transport passage 48 of the transport module 11 to a capture position 27 where the ticket is inaccessible to the patron.

The diverter module 25 includes a movable diverter 79, which is movable between a first position shown by solid lines and a second position shown by broken lines. When in its first position, the diverter 79 diverts a ticket from the transport passage 48 of the transport module 11 into the return passage 75 of the diverter module 25. When in its second position, the diverter 79 diverts a ticket from the transport passage 48 of the transport module 11 into the capture passage of the diverter module 25. A diverter solenoid 80 is coupled to the diverter 79 for moving the diverter 79 between its first and second positions. The diverter solenoid 80 is connected to the diverter 79 by linkage 81, which is shown by solid lines for the first position of the diverter 79 and by broken lines for the second position of the diverter 79.

The diverter module 25 includes a drive roller 83 and a corresponding pressure roller 84 for transporting a ticket through the return passage 75. The diverter module 25 further includes a drive roller 85 and a corresponding pressure roller 86 for transporting a ticket through the capture passage 77. The drive rollers 83 and 85 are coupled by pulleys 87, 88 and 89 and a belt 90 to the axle 72 of the drive rollers 58 of the transport module 11. The pulleys 87 and 88 are on the axles 91 and 92 of the drive rollers 83 and 85 respectively and the pulley 89 is on the axle 72. Accordingly, the drive rollers 83 and 85 also are driven by the drive motor 64 of the transport module 11.

The pressure roller 86 is movable between first and second positions. When in its first position, as shown by broken lines, the pressure roller 86 contacts the drive roller 85 for transporting a ticket through the capture passage 77. When in its second position as shown by solid lines, the pressure roller 86 is out of contact with the drive roller 85, whereby the ticket is not transported through the capture passage by the rollers 85 and 86; and any ticket in the capture passage 77 at the time the pressure roller 86 is moved to its second position remains in escrow in the capture passage due to contact with the curved structure 76 defining the capture passage 77. An escrow solenoid 94 is coupled to the pressure roller 86 for moving the pressure roller 86 between its first and second positions. The escrow solenoid 94 is connected to the pressure roller 86 by linkage 95, which is shown by broken lines for the first position of the pressure roller 86 and by solid lines for the second position of the pressure roller 86.

The diverter module 25 includes a photosensor 97 positioned for sensing the passage of a ticket through the return passage 75. The diverter module 25 also contains a photosensor 98 for sensing the entry of a ticket into capture passage 77 and the passage of the ticket through the capture passage 77. LED's 99 and 100 are positioned opposite the photosensors 97 and 98 for providing light beams to the photosensors that are interrupted when a ticket passes between the LED's 99, 100 and the photosensors 97, 98 respectively. A preferred embodiment of the diverter module 25 is described in the cross-referenced patent application by Gregory E. Miller and John E. Toth for "Ticket Diverter Module", the disclosure of which is incorporated herein by reference thereto.

Figure 10:
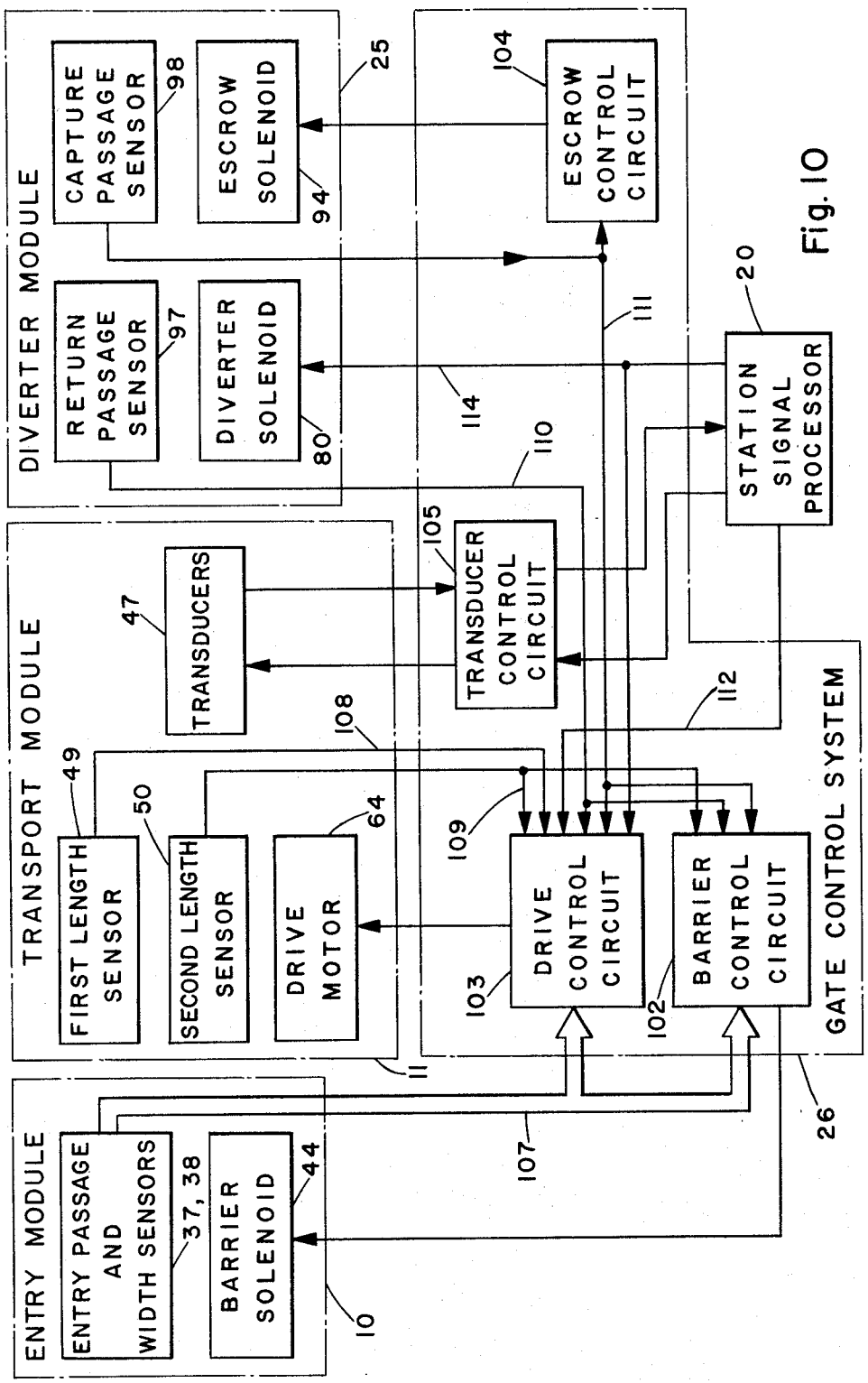
FIG. 10 is a block diagram of that portion of the electrical system of the ticket handling system of FIG. 2 that pertains to the functional cooperation between the different modules of such ticket handling system and with the signal processor.

The gate control system 26 includes barrier control circuit 102, a drive control circuit 103, an escrow control circuit 104 and a transducer control circuit 105. These circuits may be located separate from the respective modules containing the components that they control (as shown in FIG. 10), or they may be located in such modules. For example, the barrier control circuit 102 can be located in the entry module 10; the drive control circuit 103 and/or the transducer control circuit 105 can be located in the transport module 11 and/or the escrow control circuit 104 can be located in the diverter module 25.

The gate control system 26 is shown in FIG. 10 as connected directly to the station signal processor 20, although such connection preferably is made through the local signal processor 15.

The drive control circuit 103 controls the operation of the drive motor 64 in the transport module 11. The drive control circuit 103 receives signals on lines 107 from the entry passage and width sensors 38, 39 in the entry module 11; on lines 108 and 109 from the first and second sensors 49, 50 in the transport module; on line 110 from the return passage sensor 97 and on line 111 from the capture passage sensor 99 in the diverter module 25; and on lines 112 and 114 from the station signal processor 20.

The barrier control circuit 102 controls the operation of the barrier solenoid 44 in the entry module 10. The barrier control circuit 102 receives signals on lines 107 from the entry passage and width sensors 38, 39 in the entry module 11; on line 109 from the second sensor 50 in the transport module 11; and on line 110 from the return passage on line 110 from the return passage sensor 97 and on line 111 from the capture passage sensor 98 in the diverter module 25.

The escrow control circuit 104 controls the operation of the escrow solenoid 94. The escrow control circuit 104 receives a signal on line 111 from the capture passage sensor 98 in the diverter module 25.

The diverter solenoid 80 in the diverter module 25 is controlled in response to a control signal on line 114 from the station signal processor 20 that is fed through the gate control system 26.

The transducer control circuit 105 controls the operation of the transducer 47 in response to signals from the station signal processor 20 and feeds the read signal from the transducer 47 to the station signal processor 20. The operation of the transducer control circuit 105 is considerably more complex and it is known to those skilled in the art. The particular operation of the transducer control circuit 105, will be apparent to those skilled in such art and an understanding of such operation is not necessary to an understanding of the present invention.

Operation of the ticket handling system of FIGS. 4, 5, 6 and 10 for a ticket processing system for an exit gate commences when a ticket is entered into the throat 37 of the entry module 10. The drive control circuit 103 responds to the signals on lines 107 from the sensors 38 and 39 in the entry module 10 by determining if the entered ticket is of at least a predetermined width corresponding to the spacing of the sensors 38 and 39. If the signals on lines 107 indicate that the entered ticket is of at least the predetermined width, the drive control circuit 103 causes the drive motor 64 to drive the transport drive rollers 55, 56, 57 and 58 in the transport module to transport the ticket in a forward direction through the transport passage 48 toward the transducer head 47. If the signals on line 107 do not indicate that the entered ticket is of at least the predetermined width, the drive control circuit 103 causes the drive motor 64 to drive the transport rollers 55, 56, 57 and 58 to transport the ticket in a reverse direction back out toward the throat 37 of the entry module 10, where it may be retrieved by the patron.

Assuming that the entered ticket is of at least the predetermined width and is being transported forward toward the transducer head 47, the leading edge of the ticket is next sensed by the first sensor 49 in the transport module 11. The drive control circuit 103 responds to the signal on line 108 from the first sensor 49 in combination with the signals on lines 107 from the entry sensors 38, 39 to determine if the entered ticket is shorter than the first predetermined distance from the photosensors 38, 39 to the photosensor 49. If so, the drive control circuit 103 causes the drive motor 64 to reverse direction and cause the transport rollers 55, 56, 57, 58 to transport the ticket back out toward the throat 37 of the entry module 10, where it may be retrieved by the patron. Accordingly, an entered ticket that is shorter than the third predetermined distance between the drive rollers 55 and 56 will not become suspended therebetween.

If the drive control circuit 103 determines in response to the signals on lines 107 and 108 that the entered ticket is not shorter than the first predetermined distance, the drive control circuit 103 causes the drive motor 64 to continue operating in the same direction and the entered ticket continues to be transported forward toward the transducer head 47.

The leading edge of the ticket is next sensed by the second sensor 50 in the transport module 11. The drive control circuit 103 responds to the signal on line 109 from the second sensor in combination with the signals on line 107 from the entry sensors 38, 39 to determine if the length of the entered ticket is the second predetermined distance from photosensors 38, 39 to the photosensor 50. If not, the drive control circuit 103 causes drive motor 64 to reverse direction and cause the transport rollers 55, 56, 57 and 58 to transport the ticket back out toward the throat 37 of the entry module 10, where it may be retrieved by the patron.

If the drive control circuit 103 determines in response to the signals on lines 107 and 109 that the length of the entered ticket is the second predetermined distance, the drive control circuit 103 causes the drive motor 64 to continue operating in the same direction and the entered ticket continues to be transported toward the transducer head 47.

The barrier control circuit 102 responds to the signals on lines 107 to determine if the entered ticket has passed completely through the throat 37 in the entry module 10, and further responds to the signal on line 109 to determine if the length of the entered ticket is the second predetermined distance. Upon determining that the ticket has passed completely through the throat 37 and is of the desired predetermined length, the barrier control circuit 102 causes the barrier solenoid 44 to move the barrier to its first position for blocking entry of tickets into the entry module 10. This prevents the ticket handling system from becoming jammed by the entry of more than one ticket before the handling of the one ticket is completed.

The ticket is transported past the transducer head 47, and the magnetically encoded signal on the ticket is read by the transducer head 47 to provide a read signal that is fed to the station signal processor 20. It may be necessary to transport the ticket back and forth past the transducer head 47 in accordance with the processing of the ticket, in which event, the station signal processor 20 provides signals on line 112 to the drive control circuit 103 to cause the drive motor to be driven in the desired direction for prescribed intervals.

After the signal processing by the station signal processor 20 subsequent to the receipt of the read signal is completed, the station signal processor 20 provides a signal on line 112 to the drive control circuit 103 to cause the ticket to be transported in the forward direction from the transport module 11 into the diverter module 25; and the station signal processor 20 further provides a control signal on line 114 to the diverter solenoid 80 to indicate whether the ticket is to be returned to the patron or captured.

The diverter solenoid 80 responds to the control signal on line 114 by moving the diverter 79 (if it is not already so positioned) to cause the ticket to enter either the return passage 75 or the capture passage 77.

When the ticket is diverted into the return passage, it is gripped by the transport drive roller 83 and transport pressure roller 84 and transported to the exit position 29, where it may be retrieved by the patron.

When the ticket is diverted into the capture passage it is gripped by the transport drive roller 85 and the transport pressure roller 86 and transported toward the capture position 27.

The capture passage sensor 98 sends on signal on line 111 to the escrow control circuit in response to sensing the passage of the leading edge of the ticket through the capture passage 77. The escrow control circuit 104 responds to such a signal on line 111 by causing the escrow solenoid 94 to move the pressure roller 86 to its second position out of contact with the ticket for a predetermined period, whereupon the transport rollers 85 and 86 are disabled temporarily from further transporting the ticket through the capture passage; and the ticket is held in escrow in the capture passage 77.

The signal on line 111 indicating the presence of the ticket in the capture passage 77 also is provided to the drive control circuit 103 where it is processed with the control signal on line 114 from the station signal processor 20 to determine whether the ticket should have been diverted to the capture passage 77. If the ticket should have been diverted to the capture passage 77, the drive control circuit 103 continues to cause the drive motor 64 to be driven in the forward direction, and after the predetermined period, the escrow solenoid moves the pressure roller 86 to its first position in contact with the ticket, whereupon the ticket is transported to the capture position 29 from which it is discharged into the capture bin 28.

However, when the drive control circuit 103 responds to the signals on lines 111 and 114 by determining that a ticket is in the capture passage 77 when it should have diverted to the return passage 75, the drive control circuit 103 turns off the drive motor 64 and thereby shuts down the ticket handling system. When the ticket handling system is shut down an indication is provided to the patron by the patron display indicators that he should seek the assistance of the station attendant for retrieving his ticket. The station attendant then opens the diverter module 25 and removes the ticket from the capture passage 77 and gives it to the patron. Were if not for this system of holding the ticket in escrow within the capture passage 77, it would be necessary for the station attendant to search through the bin 28 to locate the ticket that was erroneously diverted to the capture passage 77.

When the ticket is removed from the exit position 27, it completes its passage through the return passage 75 in the diverter module 25, and the sensor 97 provides a signal on line 110 to the barrier control circuit 102 and the drive control circuit 103 indicating that the ticket has passed through the return passage 75 from the transport module 11.

When the ticket passes from the capture position 29 it completes its passage from the capture passage 77 in the diverter module 25 and the sensor 98 provides a signal on line 11 to the barrier control circuit 102 and the drive control circuit 103 indicating that the ticket has passed through the capture passage 77 from the transport module 11.

The barrier control circuit 102 responds to a signal on either line 110 or 111 indicating the passage of the ticket through either the return passage 75 or the capture passage 77 by causing the barrier solenoid 44 to move the barrier 43 to its second position for enabling tickets to be entered through the throat 37 of the entry module 10 into the transport module 11.

The drive control circuit 103 responds to a signal on either line 110 or 111 indicating the passage of the ticket through either the return passage 75 or the capture passage 77 by turning off the drive motor 64.

The ticket handling system is again ready for the entry of another ticket.

Figure 8:
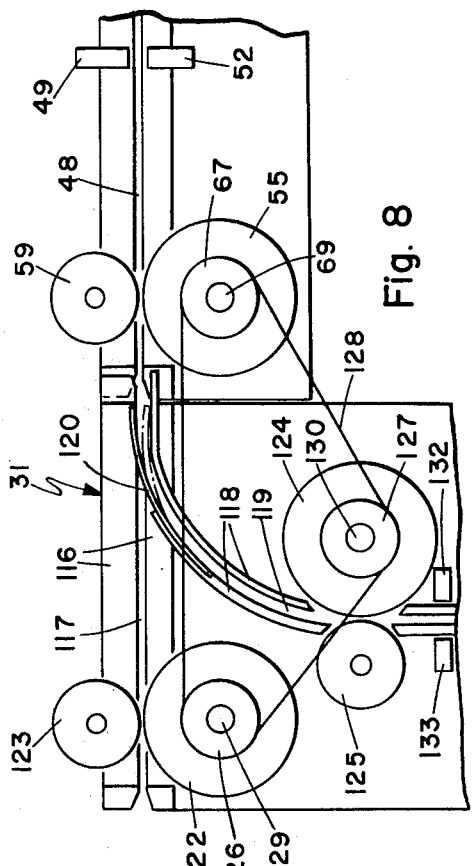
FIG. 8 is a schematic side elevation view of the diverter module and a portion of the transport module included in the ticket handling system of FIG. 3.
Figure 7:
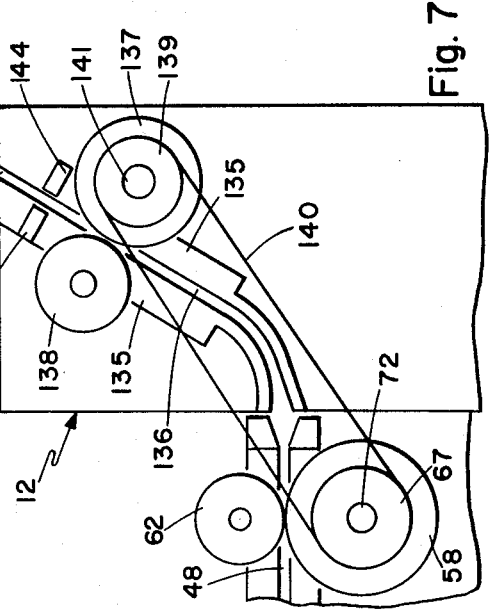
FIG. 7 is a schematic side elevation view of the exit module included in the ticket handling systems of FIGS. 1 and 3.

The alternative embodiment of the ticket handling system used in the ticket processing system for an exit gate as shown in FIG. 3, is described with reference to FIGS. 7, 8, and 11. This ticket handling system includes an entry module 10 and a transport module 11 that are constructed in the same manner as the like-numbered modules described above in relation to the system of FIG. 2. However, the system of FIG. 3 includes a diverter module 31 that is less complex than the diverter module 25 of the system of FIG. 2, and further includes an exit module 12. The diverter module 31 is mechanically interfaced with and between the entry module 10 and the transport module 11; and the exit module 12 is mechanically interfaced with the transport module 11. The diverter module 31 includes fingers 35 for interlocking with fingers 35 of the adjacent modules 10, 11 for effecting mechanical coupling between the modules to provide a continuous aligned, unobstructed passage for the tickets from one module to another.

The diverter module 31 includes structure 116 defining a transport passage 117 for passing a ticket from the entry module 10 to the transport passage 48 of the transport module 11. The diverter module 31 also includes structure 118 defining a capture passage 119 for passing a ticket from the transport passage 48 of the transport module 11 to the capture position 33 (FIG. 3) where the ticket is inacessible to the patron.

The diverter module 31 includes a flexible leaf diverter 120 secured within the capture passage 119 and extending to within the transport passage 117 for enabling the ticket to be passed in the forward direction into the transport module 11 and for diverting the ticket into the capture passage 119 when the ticket is passed in the reverse direction back from the transport module 11.

The diverter 120 normally is in the position shown by the solid lines for diverting the ticket into the capture passage 119. When a ticket is transported in the forward direction through the transport passage 117, the ticket pushes against the diverter 120 and pushes the diverter to the position shown by the broken lines to enable the ticket to pass into the transport module 11.

The diverter module 31 includes transport drive rollers 122 and transport pressure rollers 123 for transporting the ticket through the transport passage 117. The diverter module 31 includes a transport drive roller 124 and a transport pressure roller 125 for transporting the ticket through the capture passage 119. The drive rollers 122 and 124 are coupled by pulleys 126 and 127 respectively and a belt 128 to a pulley 67 on the shaft 69 of the transport rollers 55 of the transport module 11. The pulleys 126 and 127 are on the axles 129 and 130 of the drive rollers 122 and 124 respectively. Accordingly, the drive rollers 122 and 124 also are driven by the drive motor 64 of the transport module 11. When the drive motor 64 is driven in the forward direction, the rollers 122 and 123 can transport a ticket forward through the transport passage 117 toward the transport module 11; and when the drive motor 64 is driven in the reverse direction, the rollers 124 and 125 can transport a ticket back from the transport module 11 and through the capture passage 119 to the capture position 33.

The diverter module 31 includes a photosensor 132 positioned for sensing the passage of a ticket through the capture passage 119. The diverter module also includes an LED 133 positioned opposite the photosensor 132 for providing a light beam to the photosensor 132 that is interrupted when a ticket passes between the LED 133 and the photosensor 132.

A preferred embodiment of the diverter module 31 is described in the cross-refrenced patent application by Gregory E. Miller for "Static Diverter" Module, the disclosure of which is incorporated herein by reference thereto.

The exit module 12 includes structure 135 defining a return passage 136 for passing a ticket from the transport passage 48 of the transport module 11 to the exit position 24 where the ticket is accessible to the patron.

The exit module 12 includes a transport drive roller 137 and a transport pressure roller 138 for transporting the ticket through the return passage 136 to the exit position 24. The drive roller 137 is coupled by a pulley 139 and a belt 140 to the pulley 67 on the axle 72 of the drive rollers 58 of the transport module 11. The pulley 139 is on the axle 141 of the drive roller 137. Accordingly, the drive roller 137 is driven by the drive motor 64 of the transport module 11.

The exit module 12 includes a photosensor 143 positioned for sensing the passage of a ticket through the return passage 136 of the exit module 12. The exit module 12 also includes an LED 144 positioned opposite the photosensor 143 for providing a light beam to the photosensor 143 that is interrupted when a ticket passes between the LED 144 and the photosensor 143.

A preferred embodiment of the exit module 12 is described in the cross-referenced patent application by Gregory E. Miller for "Ticket Exit Drive Module", the disclosure of which is incorporated herein by reference thereto.

The gate control system 32 includes a barrier control circuit 102, a drive control circuit 103, and a transducer control circuit 105. These circuits may be located separate from the respective modules containing the components that they control (as shown in FIG. 11), or they may be located in such modules. For example, the barrier control circuit 102 can be located in the entry module 10; and/or the drive control circuit 103 and/or the transducer control circuit 105 can be located in the transport module 11.

Figure 11:
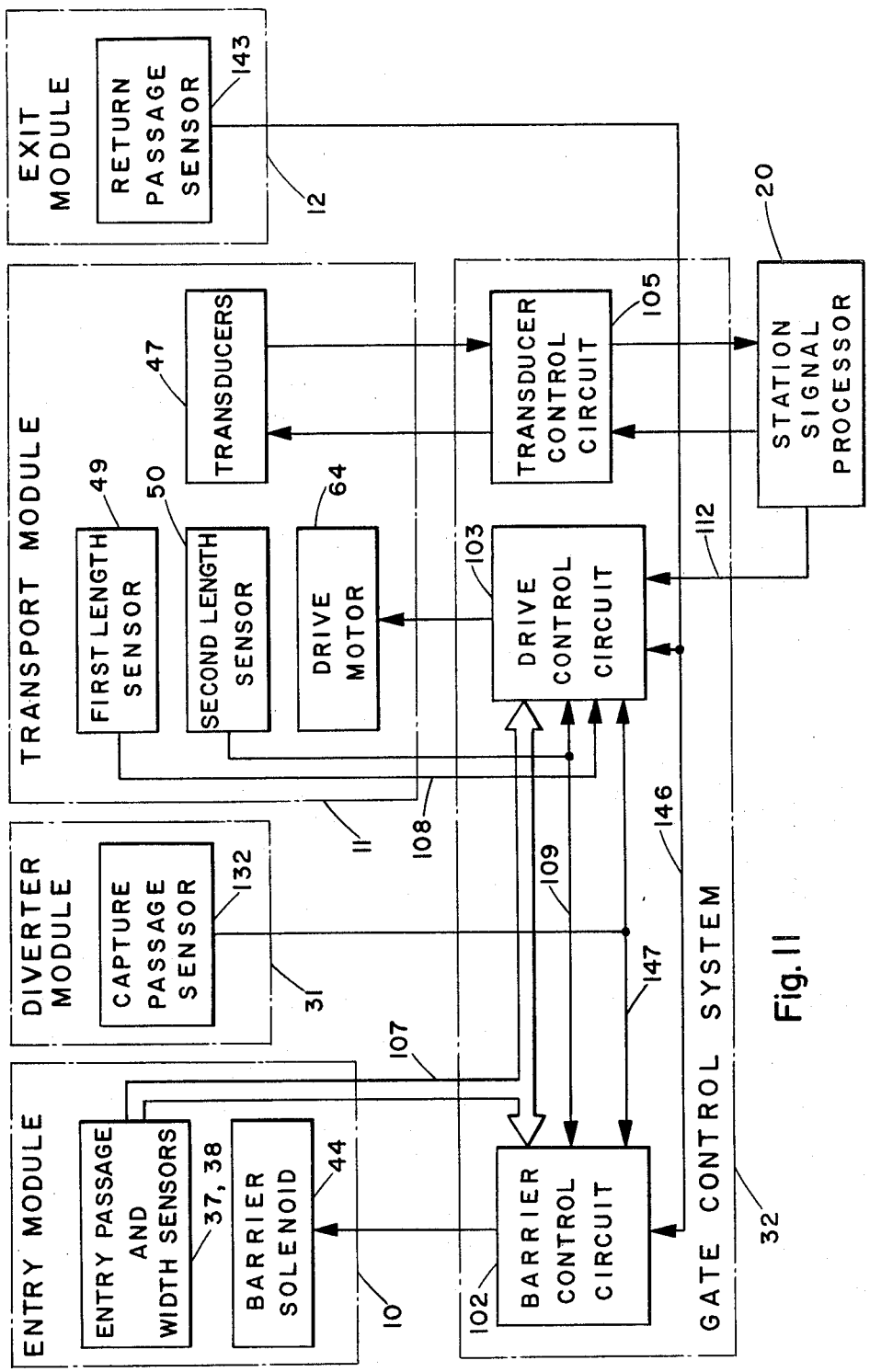
FIG. 11 is a block diagram of that portion of the electrical system of the ticket handling system of FIG. 3 that pertains to the functional cooperation between the different modules of such ticket handling system and with the signal processor.

The gate control system 32 is shown in FIG. 11 as connected directly to the station signal processor 20, although such connection preferably is made through the local signal processor 15.

The drive control circuit 103 controls the operation of the drive motor 64 in the transport module 11. The drive control circuit 103 receives signals on lines 107 from the entry passage and width sensors 38, 39 in the entry module 11; on lines 108 and 109 from the first and second sensors 49, 50 in the transport module 11; on line 146 from the return passage sensor 143 in the exit module 12 on line 147 from the capture passage sensor 132 in the diverter module 31; and on line 112 from the station signal processor 20.

The barrier control circuit 102 controls the operation of the barrier solenoid 44 in the entry module 10. The barrier control circuit 102 receives signals on lines 107 from the entry passage and width sensors 38, 39 in the entry module 11; on line 109 from the second sensor 50 in the transport module 11; and on line 146 from the return passage sensor 143 in the exit module 12 and on line 147 from the capture passage sensor 132 in the diverter module 31.

The transducer control circuit 105 controls the operation of the transducer 47 in response to signals from the station signal processor 20 and feeds the read signal from the transducer 47 to the station signal processor 20 as noted above.

Operation of the ticket handling system of FIGS. 3 and 11 for a ticket processing system for an exit gate commences when a ticket is entered into the throat 37 of the entry module 10. The drive control circuit 103 responds to the signals on lines 107 from the sensors 38 and 39 in the entry module 10 by determining if the entered ticket is of at least a predetermined width corresponding to the spacing of the sensors 38 and 39. If the signals on lines 107 indicate that the entered ticket is of at least the predetermined width, the drive control circuit 103 causes the drive motor 64 to drive the transport drive rollers 55, 56, 57 and 58 in the transport module and the transport drive rollers 122 in the diverter module 31 to transport the ticket in a forward direction through the transport passages 117 and 48 toward the transducer head 47. If the signals on line 107 do not indicate that the entered ticket is of at least the predetermined width, the drive control circuit 103 causes the drive motor 64 to drive the transport rollers 55, 56, 57, 58 and 122 to transport the ticket in a reverse direction back out toward the throat 37 of the entry module 10, where it may be retrieved by the patron.

Assuming that the entered ticket is of at least the predetermined width and is being transported forward toward the transducer head 47, the leading edge of the ticket is next sensed by the first sensor 49 in the transport module 11. The drive control circuit 103 responds to the signal on line 108 from the first sensor 49 in combination with the signals on lines 107 from the entry sensors 38, 39 to determine if the entered ticket is shorter than a first predetermined distance from the photosensors 38, 39 to the photosensor 49. If so, the drive control circuit 103 causes the drive motor 64 to reverse direction and cause the transport rollers 55, 56, 57, 58 and 122 to transport the ticket back out toward the throat 37 of the entry module 10, where it may be retrieved by the patron.

If the ticket is so short, however, that the trailing edge thereof has cleared the diverter 120 in the diverter module 31, then the ticket is diverted into the capture passage 119 when the drive motor 64 drives the transport drive rollers 55, 56, 57 and 58 in the reverse direction.

If the drive control circuit 103 determines in response to the signals on lines 107 and 108 that the entered ticket is not shorter than the first predetermined distance, the drive control circuit 103 causes the drive motor 64 to continue operating in the same direction and the entered ticket continues to be transported forward toward the transducer head 47.

The leading edge of the ticket is next sensed by the second sensor 50 in the transport module 11. The drive control circuit 103 responds to the signal on line 109 from the second sensor in combination with the signals on line 107 from the entry sensors 38, 39 to determine if the length of the entered ticket is the second predetermined distance from the photosensors 38, 39 to the photosensor 50. If not, the drive control circuit 103 causes the drive motor 64 to reverse direction and cause the transport rollers 55, 56, 57, 58 and 122 to transport the ticket back out toward the throat 37 of the entry module 10, where it may be retrieved by the patron.

Preferably, the distance between the second sensor 50 and the end of the diverter 120 is such that the trailing end of a ticket that is longer than the second predetermined length, will not have cleared the diverter 120 by the time the transport drive rollers 55, 56, 57 58 and 122 are driven in the reverse direction; whereby the ticket is driven back through the transport passage 117 and out through the entry throat 37 where it is accessible to the patron. The diverter 120 should be sufficiently flexible as not to impede the reverse transportation of the ticket across the diverter back toward the entry throat 37 of the entry module.

If the drive control circuit 103 determines in response to the signals on lines 107 and 109 that the length of the entered ticket is the second predetermined distance, the drive control circuit 103 causes the drive motor 64 to continue operating in the same direction and the entered ticket continues to be transported toward the transducer head 47.

The barrier control circuit 102 responds to the signals on lines 107 to determine that the entered ticket has passed completely through the throat 37 in the entry module 10, and further responds to the signal on line 109 to determine that the length of the entered ticket is the second predetermined distance. Upon making such determinations, the barrier control circuit 102 causes the barrier solenoid 44 to move the barrier to its first position for blocking entry of tickets into the entry module 10. This prevents the ticket handling system from becoming jammed by the entry of more than one ticket before the handling of the one ticket is completed.

The ticket is transported past the transducer head 47, and the magnetically encoded signal on the ticket is read by the transducer head 47 to provide a read signal that is fed to the station signal processor 20. It may be necessary to transport the ticket back and forth past the transducer head 47 in accordance with the processing of the ticket, in which event, the station signal processor 20 provides signals one line 112 to the drive control circuit 103 to cause the drive motor 64 to be driven in the desired direction for prescribed intervals.

After the signal processing by the station signal processor 20 subsequent to the receipt of the read signal is completed, the station signal processor 20 provides a signal on line 112 to the drive control circuit 103 to cause the ticket to be transported either in the forward direction from the transport module 11 into the return passage 136 of the exit module 12 to be returned to the patron, or in the reverse direction from the transport module 11 into the capture passage 119 of the diverter module 31 when the ticket is to be captured.

When the ticket is diverted into the return passage 136, it is gripped by the transport driver roller 137 and transport pressure rollers 138 and transported to the exit position 24, where it may be retrieved by the patron.

When the ticket is diverted into the capture passage 119, it is gripped by the transport drive roller 137 and the transport pressure roller 138 and transported toward the capture position 33; and is discharged into the bin 28.

When the ticket is removed from the exit position 24, it completes its passage through the return passage 136 in the exit module 12, and the sensor 143 provides a signal on line 146 to the barrier control circuit 103 and the drive control circuit 103 indicating that the ticket has passed through the return passage 136 from the the transport module 11.

When the ticket passes from the capture position 33, it completes its passage from the capture passage 119 in the diverter module 31 and the sensor 132 provides a signal on line 147 to the barrier control circuit 102 and the drive control circuit 103 indicating that the ticket has passed through the capture passage 119 from the transport module 11.

The barrier control circuit 102 responds to a signal on either line 146 or 147 indicating the passage of the ticket through either the return passage 136 or the capture passage 119 by causing the barrier solenoid 44 to move the barrier 43 to its second position for enabling tickets to be entered through the throat 37 of the entry module 10 into the transport module 11.

The drive control circuit 103 responds to a signal on either line 146 or 147 indicating the passage of the ticket through either the return passage 136 or the capture passage 119 by turning off the drive motor 64.

The ticket handling system is again ready for the entry of another ticket.

The preferred embodiment of the ticket handling system used in the ticket processing system for an entry gate as show in FIG. 1 is described with reference to FIG. 9. This ticket handling system includes an entry module 10, a transport module 11, and an exit module 12 that are constructed in the same manner as the like-numbered modules described above in relation to the exit gate systems of FIGS. 2 and 3. The transport module 11 is mechanically interfaced with and between the entry module 10 and the exit module 12.

The gate control system 13 includes a barrier control circuit 102, a drive control circuit 103, and a transducer control circuit 150. These circuits may be located separate from the respective modules containing the components that they control (as shown in FIG. 9), or they may be located in such modules. For example, the barrier control circuit 102 can be located in the entry module 10; and/or the drive control circuit 103 and/or the transducer control circuit 150 can be located in the transport module 11.

Figure 9:
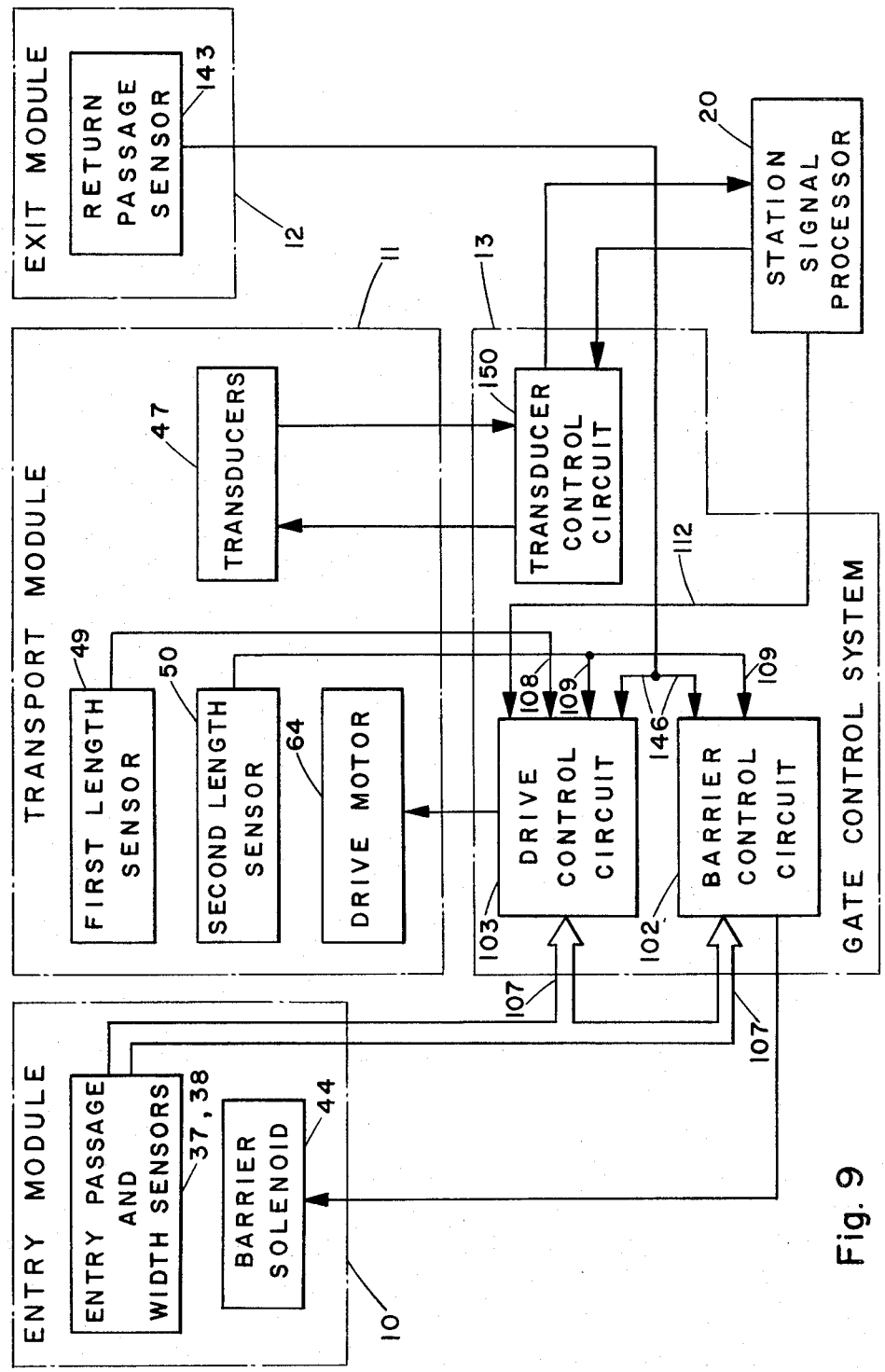
FIG. 9 is a block diagram of that portion of the electrical system of the ticket handling system of FIG. 1 that pertains to the functional cooperation between the different modules of such ticket handling system and with the signal processor.

The gate control system 13 is shown in FIG. 9 as connected directly to the station signal processor 20, although such connection preferably is made through the local signal processor 15.

The drive control circuit 103 controls the operation of the drive motor 64 in the transport module 11. The drive control circuit 103 receives signals on lines 107 from the entry passage and width sensors 38, 39 in the entry module 11; and on lines 108 and 109 from the first and second sensors 49, 50 in the transport module 11; on line 146 from the return passage sensor 143 in the exit module 12; and on line 112 from the station signal processor 20.

The barrier control circuit 102 controls the operation of the barrier solenoid 44 in the entry module 10. The barrier control circuit 102 receives signals on lines 107 from the entry passage and width sensors 38, 39 in the entry module 11; on line 109 from the first and second sensor 50 in the transport module 11; on line 146 from the return passage sensor 143 in the exit module 12.

The transducer control circuit 150 controls the operation of the transducer 47 in response to signals from the station signal processor 20 and feeds the read signal from the transducer 47 to the station signal processor 20 as noted above. The transducer control circuit 105 also provides the write signal from the station signal processor 20 to the transducer head 47; compares the write signal to the second read signal, and provides the verification signal to the station signal processor as discussed above with relation to FIG. 1. The particular operation of the transducer control circuit 150 will be apparent to those skilled in such art; and an understanding of such operation is not necessary to an understanding of the present invention.

The operation of the ticket handling system of FIG. 9 for a ticket processing system for an entry gate commences when a ticket is entered into the throat 37 of the entry module 10. The drive control circuit 103 responds to the signals on lines 107 from the sensors 38 and 39 in the entry module 10 by determining if the entered ticket is of at least a predetermined width corresponding to the spacing of the sensors 38 and 39. If the signals on lines 107 indicate that the entered ticket is of at least the predetermined width, the drive control circuit 103 causes the drive motor 64 to drive the transport drive rollers 55, 56, 57 and 58 in the transport module 11 to transport the ticket in a forward direction through the transport passage 48 toward the transducer head 47. If the signals on line 107 do not indicate that the entered ticket is of at least the predetermined width, the drive control circuit 103 causes the drive motor 64 to drive the transport rollers 55, 56, 57 and 58 to transport the ticket in a reverse direction back out toward the throat 37 of the entry module 10, where it may be retrieved by the patron.

Assuming that the entered ticket is of at least the predetermined width and is being transported forward toward the transducer head 47, the leading edge of the ticket is next sensed by the first sensor 49 in the transport module 11. The drive control circuit 103 responds to the signal on line 108 from the first sensor 49 in combination with the signals on lines 107 from the entry sensors 38, 39 to determine if the entered ticket is shorter than a first predetermined distance from the photosensors 38, 39 to the photosensor 49. If so, the drive control circuit 103 causes the drive motor 64 to reverse direction and causes the transport rollers 55, 56, 57, 58 to transport the ticket back out toward the throat 37 of the entry module 10, where it may be retrieved by the patron.

If the drive control circuit 103 determines in response to the signals on lines 107 and 108 that the entered ticket is not shorter than the first predetermined distance, the drive control circuit 103 causes the drive motor 64 to continue operating in the same direction and the entered ticket continues to be transported forward toward the transducer head 47.

The leading edge of the ticket is next sensed by the second sensor 50 in the transport module 11. The drive control circuit 103 responds to the signal on line 109 from the second sensor in combination with the signals on line 107 from the entry sensors 38, 39 to determine if the length of the entered ticket is the second predetermined distance from the photosensors 38, 39 to the photosensor 50. If not, the drive control circuit 103 causes the drive motor 64 to reverse direction and cause the transport rollers 55, 56, 57 and 58 to transport the ticket back out toward the throat 37 of the entry module 10, where it may be retrieved by the patron.

If the drive control circuit 102 determines in response to the signals on lines 107 and 109 that the length of the entered ticket is the second predetermined distance, the drive control circuit 103 causes the drive motor 64 to continue operating in the same direction and entered ticket continues to be transported toward the transducer head 47.

The barrier control circuit 102 responds to the signals on lines 107 to determine that the entered ticket has passed completely through the throat 37 in the entry module 10, and further responds to the signals on line 109 to determine that the length of entered ticket is the second predetermined distance. Upon making such determinations, the barrier control circuit 102 causes the barrier solenoid 44 to move the barrier to its first position for blocking entry of tickets into the entry module 10. This prevents the ticket handling system from becoming jammed by the entry of more than one ticket before the handling of the one ticket is completed.

The ticket is transported past the transducer head 47, and the magnetically encoded signal on the ticket is read by the transducer head 47 to provide a read signal that is fed to the station signal processor 20. It may be necessary to transport the ticket back and forth past the transducer head 47 in accordance with the processing of the ticket, in which event, the station signal processor 20 provides signals on line 112 to the drive control circuit 103 to cause the drive motor 64 to be driven in the desired direction for prescribed intervals.

After the signal processing by the station signal processor 20 subsequent to the receipt of the read signal is completed, the station signal processor 20 provides a signal on line 112 to the drive control circuit 103 to cause the ticket to be transported in the forward direction from the transport module 11 into the return passage 136 of the exit module 12.

When the ticket is transported into the return passage 136, it is gripped by the transport drive roller 137 and transport pressure rollers 138 and transported to the exit position 24, where it may be retrieved by the patron.

When the ticket is removed from the exit position 24 it completes its passage through the return passage 136 in the exit module 12, and the sensor 143 provides a signal on line 146 to the barrier control circuit 102 and the drive control circuit 103 indicating that the ticket has passed through the return passage 136 from the transport module 11.

The barrier control circuit 102 responds to a signal on line 146 indicating the passage of the ticket through the return passage 136 by causing the barrier solenoid 44 to move the barrier 43 to its second position for enabling tickets to be entered through the throat 37 of the entry module 10 into the transport module 11.

The drive control circuit 103 responds to a signal on line 146 indicating the passage of the ticket through the return passage 136 by turning off the drive motor 64.

The ticket handling system is again ready for the entry of another ticket.

In an embodiment of the ticket handling system used in the ticket processing system for an entry gate alternative to the embodiment shown in FIGS. 1 and 9, the exit module 12 is eliminated, whereby the ticket handling system includes only the entry module 10 and the transport module 11. In such an alternative embodiment, (with reference to FIG. 9) the drive control circuit 103 responds to a control signal provided on line 112 from the station signal processor 20 subsequent to the processing of the read signal provided from the transducer 47 by causing the ticket to be transported in the reverse direction from the transport module 11 back through the entry module 10. When such a control signal is provided on line 112, a control signal is also provided by the station signal processor 20 to the barrier control circuit 102. The barrier control circuit 102 responds to such a control signal by causing the barrier solenoid to move the barrier 43 to its second position to enable the ticket to be transported back out through the entry module 10 where it may be retrieved by the patron. The drive control circuit 103 responds to a signal on lines 107 indicating the passage of the ticket back through the entry module 10 by turning off the drive motor 64. In other respects, such an alternative embodiment corresponds to the embodiment described with reference to FIG. 9.

We claim:

1. A ticket handling system for use in a ticket processing system that includes transducer means for reading an encoded ticket entered by a patron and for providing a read signal in response thereto and means for subsequently passing said ticket to an exit position where said ticket is accessible for return to said patron, the ticket handling system comprising a transport module including the transducer means for reading a said encoded ticket and for providing a said read signal in response thereto; and an entry module for entering said ticket into the transport module.

2. A ticket handling system for use in a ticket processing system that includes transducer means for reading an encoded ticket entered by a patron and for providing a read signal in response thereto and means for subsequently passing said ticket to an exit position where said ticket is accessible for return to said patron, the ticket handling system comprising a transport module including the transducer means for reading a said encoded ticket and for providing a said read signal in response thereto; and a second module mechanically interfaced with the transport module and including means defining a return passage for passing said ticket from the transport module to an exit position where said ticket is accessible for return to said patron.

3. A ticket handling system according to claim 2, further comprising an entry module for entering said ticket into the transport module;

wherein the second module includes first sensing means for sensing the passage of said ticket through the return passage from the transport module;

wherein the transport module includes second sensing means for sensing the entry of said ticket by a first predetermined distance into the transport module;

wherein the entry module includes third sensing means for sensing the passage of said ticket through the entry module;

movable barrier means for blocking said entry of tickets when in a first position and for enabling entry of tickets when in a second position; and barrier moving means for moving the barrier between the first and second positions; and wherein the ticket handling system includes a control means coupled to the barrier moving means and the first, second and third sensing means for causing the barrier to be moved to the first position to block ticket entry in response to the second and third sensing means sensing the entry of a ticket of a predetermined length, and for causing the barrier to be moved to the second position to enable ticket entry in response to the first sensing means sensing the passage of said ticket through the return passage from the transport module.

4. A ticket handling system according to claim 3, wherein the second module is a diverter module that further includes means defining a capture passage for passing said ticket from the transport module to a capture position where said ticket is inaccessible to said patron; and fifth sensing means for sensing the passage of said ticket through the capture passage from the transport module, and fifth sensing means for causing the barrier to be moved to the second position to enable ticket entry in response to the fifth sensing means sensing passage of said ticket through the capture passage from the transport module.

5. A ticket handling system according to claim 3, further comprising a diverter module mechanically interfaced with the transport module and including means defining a capture passage for passing said ticket from the transport module to a capture position where said ticket is inaccessible to said patron; and fifth sensing means for sensing the passage of said ticket through the capture passage from the transport module; and wherein the control means is further coupled to the fifth sensing means for causing the barrier to be moved to the second position to enable ticket entry in response to the fifth sensing means sensing passage of said ticket through the capture passage from the transport module.

6. A ticket handling system according to claim 2, for use in a said ticket processing system that further includes processing means for processing the read signal and for providing control signals subsequent thereto to incidate whether the ticket is to be returned to said patron or captured, wherein the second module is a diverter module that further includes means defining a capture passage for passing said ticket from the transport module to a capture position where said ticket is inaccessible to said patron.

7. A ticket handling system according to claim 6, wherein the transport module includes first transport means for transporting said ticket from the transport module; and drive means for driving the first transport means in accordance with given control signals from said processing means; and wherein the diverter module includes second transport means coupled to and driven by the drive means for transporting said ticket through the diverter module.

8. A ticket handling system according to claim 7, wherein the diverter module further includes sensing means for sensing the passage of said ticket through the capture passage; and wherein the ticket handling system includes control means coupled to the sensing means and the drive means for preventing the drive means from driving either transport means in response to the sensing means sensing the passage of said ticket through the capture passage.

9. A ticket handling system according to claim 6, wherein the diverter module further includes, diversion means for diverting tickets from the transport module into either the capture passage or the return passage in accordance with given control signals from the processing means.

10. A ticket handling system for use in a ticket processing system that includes transducer means for reading an encoded ticket entered by a patron and for providing a read signal in response thereto and means for subsequently passing said ticket to an exit position where said ticket is accessible for return to said patron, the ticket handling system comprising a transport module including the transducer means for reading a said encoded ticket and for providing a said read signal in response thereto; and an entry module for entering said ticket into the transport module;

wherein the entry module includes first sensing means for sensing the width of a said entered ticket and the passage of said ticket through the entry module;

wherein the transport module includes transport means for transporting said entered ticket;

and drive means for driving the transport means; and wherein the ticket handling system includes a control means coupled to the first sensing means and the drive means for causing said ticket to be transported toward the transducer means in response to the first sensing means sensing entry of a ticket of a predetermined width.

11. A ticket handling system according to claim 10, further comprising a third module mechanically interfaced with the transport module and including means defining a return passage for passing said ticket from the transport module to an exit position where said ticket is accessible for return to said patron; and second sensing means for sensing the passage of said ticket through the return passage from the transport module; and wherein the control means is further coupled to the second sensing means and the drive means for preventing the drive means from driving the transport means, in response to the second sensing means sensing the passage of said ticket through the return passage from the transport module.

12. A ticket handling system, according to claim 10, wherein the transport module includes second sensing means for sensing the entry of said ticket by a first predetermined distance into the transport module;

wherein the transport means are bidirectional; and wherein the control means is further coupled to the second sensing means for causing said ticket to be transported away from the transducer means and back through the entry module in response to the first and second sensing means sensing the entry of a ticket that is not of a predetermined length.

13. A ticket handling system according to claim 12, wherein the transport module further includes a first drive roller located between the entry module and the second sensing means for transporting said ticket;

a second drive roller located a second predetermined distance from the first drive roller in a direction away from the entry module for transporting said ticket, wherein the second predetermined distance is less than the first predetermined distance;

third sensing means for sensing the entry of said ticket by a third predetermined distance into the transport module not greater than said second predetermined distance; and wherein the control means is further coupled to the third sensing means for causing said ticket to be transported away from the transducer means and back through the entry module in response to the first and third sensing means sensing the entry of a ticket that is shorter than said third predetermined distance.

14. A ticket handling system according to claims 12 or 13, wherein the control means is further coupled to the first sensing means and the drive means for preventing the drive means from driving the transport means in response to the second sensing means sensing the passage of said ticket back through the entry module from the transport module.

15. A ticket handling system, for use in a ticket processing system that includes transducer means for reading an encoded ticket entered by a patron and for providing a read signal in response thereto and means for subsequently passing said ticket to an exit position where said ticket is accessible for return to said patron, and processing means for processing the read signal and for providing control signals subsequent thereto to indicate whether the ticket is to be returned to said patron or captured, the ticket handling system comprising a transport module including the transducer means for reading a said encoded ticket and for providing a said read signal in response thereto;

an exit module mechanically interfaced with the transport module and including means defining a return passage for passing said ticket from the transport module to an exit position where said ticket is accessible for return to said patron; and a diverter module mechanically interfaced with the transport module and including means defining a capture passage for passage said ticket from the transport module to a capture position where said ticket is inaccessible to said patron.

16. A ticket handling system according to claim 15, wherein the diverter module further includes means defining a transport passage for passing said ticket in one direction into the transport module, and diversion means in the transport passage for enabling said ticket to be passed in the one direction into the transport module and for diverting said ticket into the capture passage when said ticket is passed in the opposite direction back from the transport module.

17. A ticket handling system according to claim 16, wherein the transport module includes
   first bidirectional transport means for transporting said ticket; and
   drive means for driving the first transport means in either the one direction or the opposite direction in accordance with given control signals from the processing means; and
wherein the diverter module includes second bidirectional transport means coupled to and driven by the drive means for transporting said ticket through the diverter module in the same direction as said ticket is transported by the first transport means.

18. A ticket handling system according to claim 17,
   wherein the diverter module further includes sensing means for sensing the passage of said ticket through the capture passage; and
   wherein the ticket handling system includes control means coupled to the sensing means and the drive means for preventing the drive means from driving either transport means, in response to the sensing means sensing the passage of said ticket through the capture passage.

19. A ticket handling system according to claim 15 or 6, wherein the diverter module comprises,
   transport means for transporting said ticket through the capture passage; and
   sensing means for sensing entry of said ticket into the capture passage; and
wherein the ticket handling system further includes control means coupled to the sensing means and the transport means for disabling the transport means for a predetermined period in response to the sensing means sensing entry of said ticket into the capture passage to thereby cause said ticket to be temporarily held in the capture passage.

20. A ticket handling system according to claim 19,
   wherein the diverter module further includes diversion means for diverting tickets into the capture passage in accordance with a given control signal from the processing means; and
   wherein the control means are for coupling the processing means for receiving said given control signal and are further coupled to said transport means for preventing said transport means from transporting said ticket to the capture position when entry of said ticket into the capture passage is sensed by the sensing means in the absence of receipt of a said given control signal from the processing means.

21. A ticket handling system for use in a ticket processing system that includes transducer means for reading an encoded ticket entered by a patron and for providing a read signal in response thereto and means for subsequently passing said ticket to an exit position where said ticket is accessible for return to said patron, the ticket handling system comprising
   a transport module including the transducer means for reading a said encoded ticket and for providing a said read signal in response thereto; and
   an entry module for entering said ticket into the transport module;
   wherein the entry module includes sensing means for sensing the passage of said ticket through the entry module;
   wherein the transport module includes
      bidirectional transport means for transporting said entered ticket; and
      drive means for driving the transport means; and
   wherein the ticket handling system includes a control means coupled to the sensing means, the drive means and the transducer means for causing said ticket to be transported toward the transducer means in response to the sensing means sensing entry of said ticket, and for causing the said ticket to be transported back through the entry module to an exit position subsequent to said provision of said read signal by the transducer means.

22. A ticket handling system according to claim 21,
   wherein the transport module includes first sensing means for sensing the entry of said ticket by a first predetermined distance into the transport module;
   wherein the entry module includes
      second sensing means for sensing the passage of said ticket through the entry module;
      movable barrier means for blocking said entry of tickets when in a first position and for enabling entry of tickets when in a second position; and
      barrier moving means for moving the barrier between the first and second positions; and
   wherein the ticket handling system includes a control means coupled to the barrier moving means and the first and second sensing means for causing the barrier to be moved to the first position to block ticket entry in response to the first and second sensing means sensing the entry of a ticket of a predetermined length, and for causing the barrier to be moved to the second position to enable ticket exit back through the entry module subsequent to said provision of said read signal by the transducer means.

* * * * *

UNITED STATES PATENT AND TRADEMARK OFFICE
CERTIFICATE OF CORRECTION

PATENT NO. : 4,357,530

DATED : November 2, 1982

INVENTOR(S) : John B. Roes, Guy M. Kelly, Robert F. Case, Chandler R. Deming

It is certified that error appears in the above-identified patent and that said Letters Patent are hereby corrected as shown below:

Column 22, line 58, Claim 15 after the word "for", change "passage" to --passing--.

Signed and Sealed this

Fifth Day of April 1983

[SEAL]

Attest:

GERALD J. MOSSINGHOFF

Attesting Officer

Commissioner of Patents and Trademarks